United States Patent
Liu

(10) Patent No.: US 8,381,636 B2
(45) Date of Patent: Feb. 26, 2013

(54) SMOKING GRILL PAN

(75) Inventor: Ta Chi Liu, Tainan (TW)

(73) Assignee: Tsann Kuen (Zhangzhou) Enterprise Co., Ltd., Zhangzhou (CN)

( * ) Notice: Subject to any disclaimer, the term of this patent is extended or adjusted under 35 U.S.C. 154(b) by 761 days.

(21) Appl. No.: 12/564,461

(22) Filed: Sep. 22, 2009

(65) Prior Publication Data

US 2010/0071566 A1    Mar. 25, 2010

(30) Foreign Application Priority Data

Sep. 22, 2008   (CN) .................. 2008 2 0145678 U

(51) Int. Cl.
*B60H 3/00* (2006.01)
*A47J 37/07* (2006.01)

(52) U.S. Cl. ............ 99/324; 99/449; 126/25 R; 219/385

(58) Field of Classification Search .................... 99/324, 99/340, 357, 449, 450, 482; 126/25 R, 41 R; 219/385, 386, 400

See application file for complete search history.

(56) References Cited

U.S. PATENT DOCUMENTS

| | | | |
|---|---|---|---|
| 5,719,377 A * | 2/1998 | Giebel et al. | 219/445.1 |
| 7,301,127 B1 * | 11/2007 | Derridinger, Jr. | 219/386 |
| 8,042,459 B2 * | 10/2011 | Wu | 99/482 |

FOREIGN PATENT DOCUMENTS

| | | |
|---|---|---|
| CN | 2850294 Y | 12/2006 |
| CN | 201039937 Y | 3/2008 |

* cited by examiner

*Primary Examiner* — Kien Nguyen
(74) *Attorney, Agent, or Firm* — Rabin & Berdo, P.C.

(57) ABSTRACT

The present invention relates to a grill pan, which comprises a main body, an electrothermal tube disposed on the lower surface of the main body; wherein the electrothermal tube comprises an normal-temperature area for grilling food and an high-temperature area for burning smoking materials to generate smokes; the normal-temperature area and the high-temperature area are connected integrative, and the two ends of the electrothermal tube have an adapter connected to exterior power supply; there is a smoking box for containing smoking materials disposed on the main body corresponding with the high-temperature area. The present invention achieves the functions of roasting and smoking by only one heating source. That can reduce the cost of production and is convenient for use.

4 Claims, 3 Drawing Sheets

SMOKING GRILL PAN

FIELD OF THE INVENTION

The present invention relates to a grill pan, more particularly to a smoking grill pan.

RELATED ART

Known grill that has smoking function usually has unattached grilling device and smoking device. Both the grilling device and the smoking device have unattached heating source. In using, grilling and smoking are controlled solely. For example, Chinese patent number 200720147876.4 advances a smoked oven, which comprises a main body of the oven, a smoking box and a shell. The main body of the oven comprises a container and at least two separated heating components, wherein the first heating component is used for baking the smoked food in the container, and the second heating component is set in the container. The smoking box is set on the second heating component, and the second heating component creates smoke for smoking food by igniting the wood chips in the box. Otherwise, the Chinese patent number 200520119403.4 advances a smoked baking oven, which comprises a main body of oven, a lid, a smoked tray, an inner pan, a main heating component set in the crevice between the exterior pan of the main body of oven and the pan shell, and a heating component of smoked tray set between the bottom cover and the bottom of the exterior pan.

Above grills have the shortcomings as follows:

1. Both the roasting device and the smoking device have separate heating sources, which makes the grill have a high cost.
2. In using, the roasting device and the smoking device must be controlled solely, which is complex and discommodious for using.
3. Both the roasting device and the smoked device have separate heating sources, which make the work of cleaning the heating system be hard.
4. The grill comprises two heating sources, which will make security of the grill be lower.

SUMMARY OF THE INVENTION

To overcome the disadvantages in known grills of related art, the present invention advances a smoking grill pan, which can use only one heating source to achieve the functions of grilling and smoking.

The present invention adopts technical solution as follows:

A smoking grill pan comprises:

a main body;

an electrothermal tube disposed on the lower surface of the main body; wherein the electrothermal tube comprises a normal-temperature area for grilling food and a high-temperature area for burning smoking materials to generate smokes; the normal-temperature area and the high-temperature area are connected integrative, and the two ends of the electrothermal tube have an adapter connected to exterior power supply;

a smoking box for containing smoking materials disposed on said main body corresponding with said high-temperature area.

According to a preferred embodiment of the present invention, wherein said smoking box has a lid provided with plural smoke passage holes.

According to a preferred embodiment of the present invention, wherein said high-temperature area is set closed to the edge of the main body, and said smoking box is set closed to a corner of the edge of the main body.

According to a preferred embodiment of the present invention, wherein said smoking materials are charcoals or wood chips.

In the invention, the normal-temperature area and the high-temperature area can adopt different electrothermal materials. The high-temperature area can adopt electrothermal material of higher resistance to make it have a higher power than the normal-temperature area.

In using, electrifying the electrothermal tube, the normal-temperature area will reach a normal temperature to grill food; at the same time the high-temperature area will burn smoking materials to generate smokes for smoking food.

According to above descriptions of the present invention and compared with to the related art, the smoking grill pan of the invention has advantages as follow:

1. The invention has one heating source to achieve the functions of grilling and smoking, which can reduce the cost of production.
2. The smoked function and the grilling function can be controlled by only one power switch, which is simple and convenient for controlling of users.
3. The invention has only one heating source, which makes the work of cleaning the heating system be easy.
4. The invention has only one heating source, which makes the grill have a simple structure, a simple assemblage, a high productive efficiency and a high using security.
5. There is a separable box lid on the smoking box, which is convenient to change the smoking materials in the smoking box and to clean the smoking box.

BRIEF DESCRIPTION OF THE DRAWINGS

The present invention will be further described according to the drawings and the embodiment.

DETAILED DESCRIPTION OF THE PREFERRED EMBODIMENTS

Figure 1:
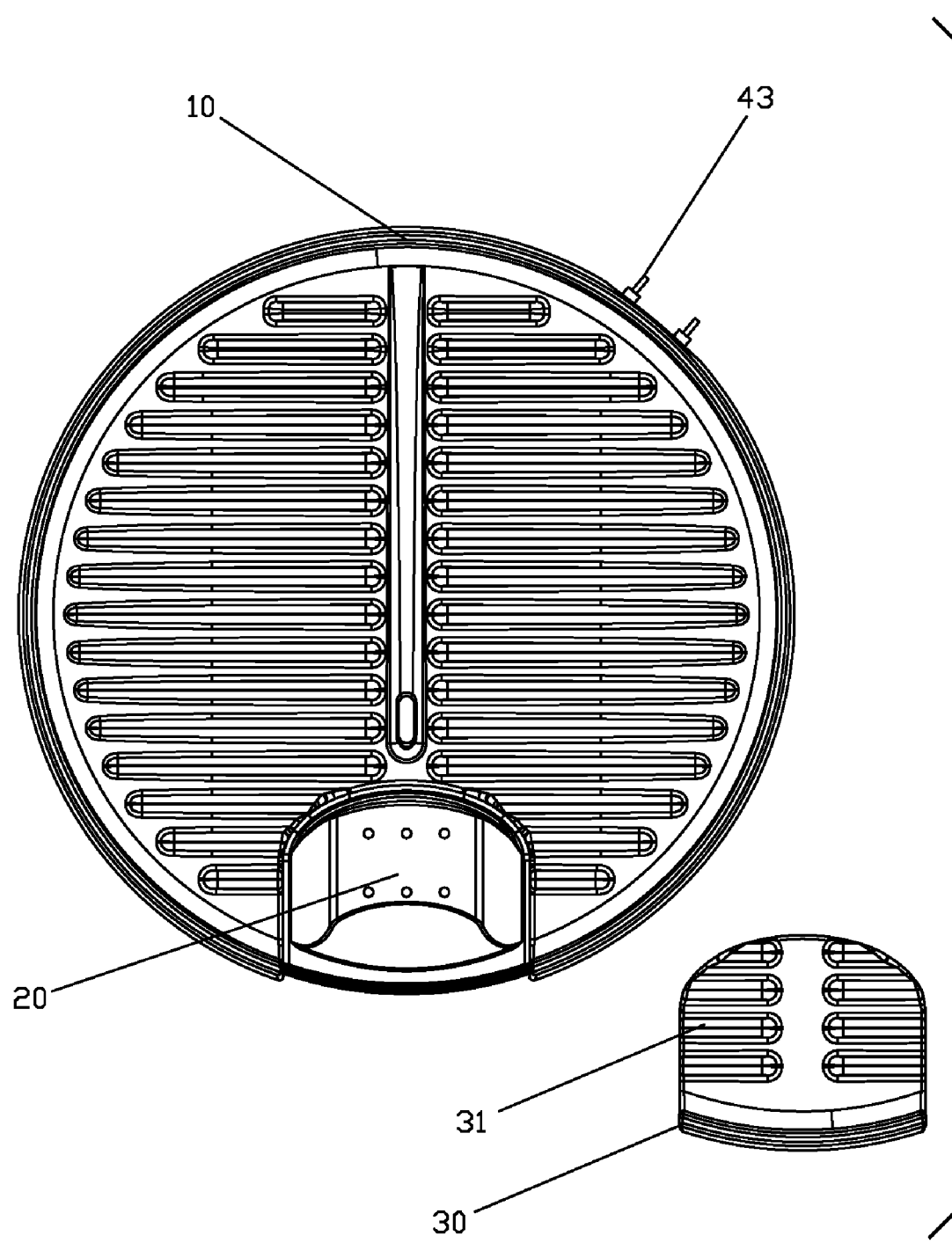
FIG. 1 is a structure sketch map according to a preferred embodiment of the smoking grill pan of the invention when the lid separated from the smoking box.
Figure 2:
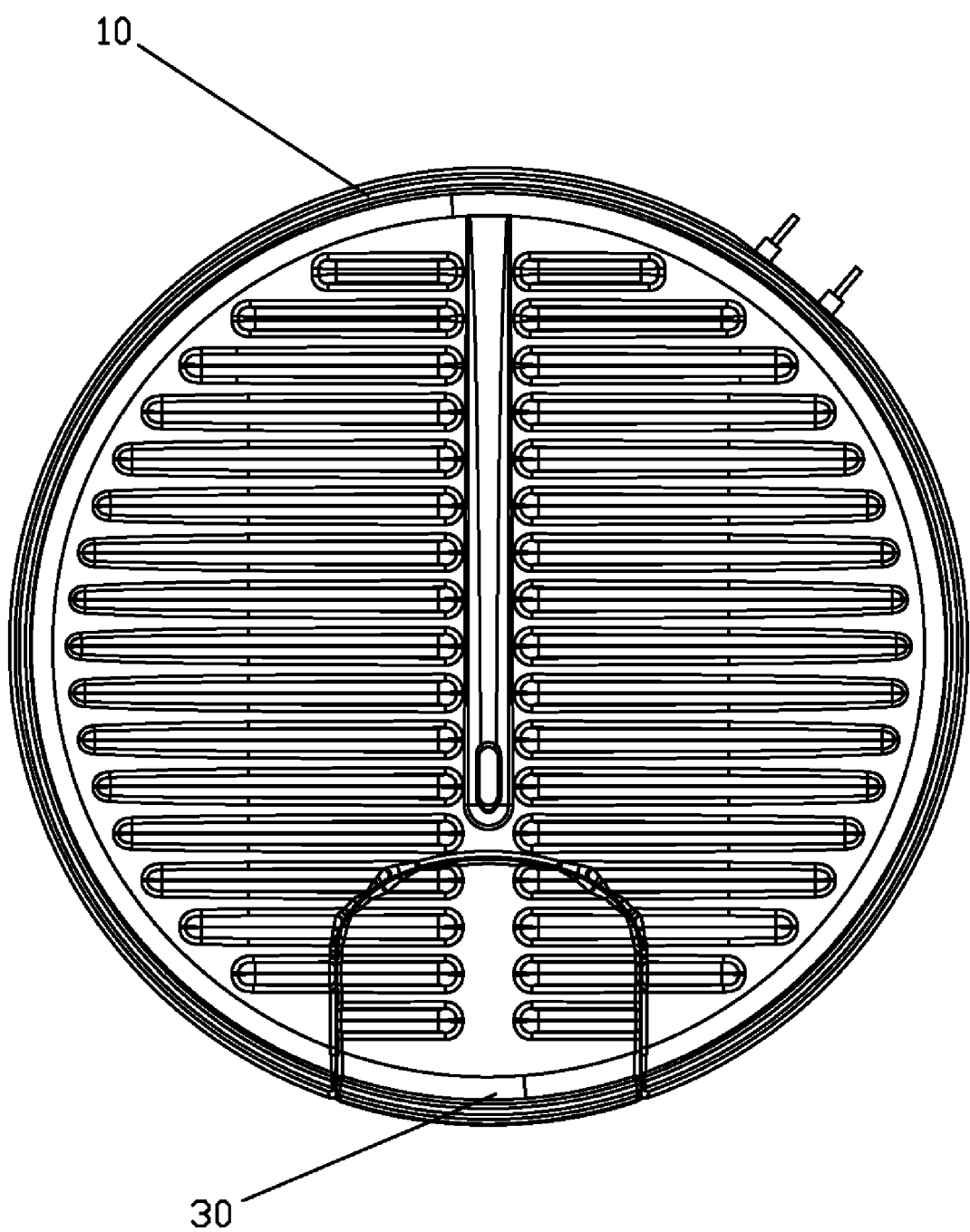
FIG. 2 is a structure sketch map according to a preferred embodiment of the smoking grill pan of the invention when the lid installed on the grill pan.
Figure 3:
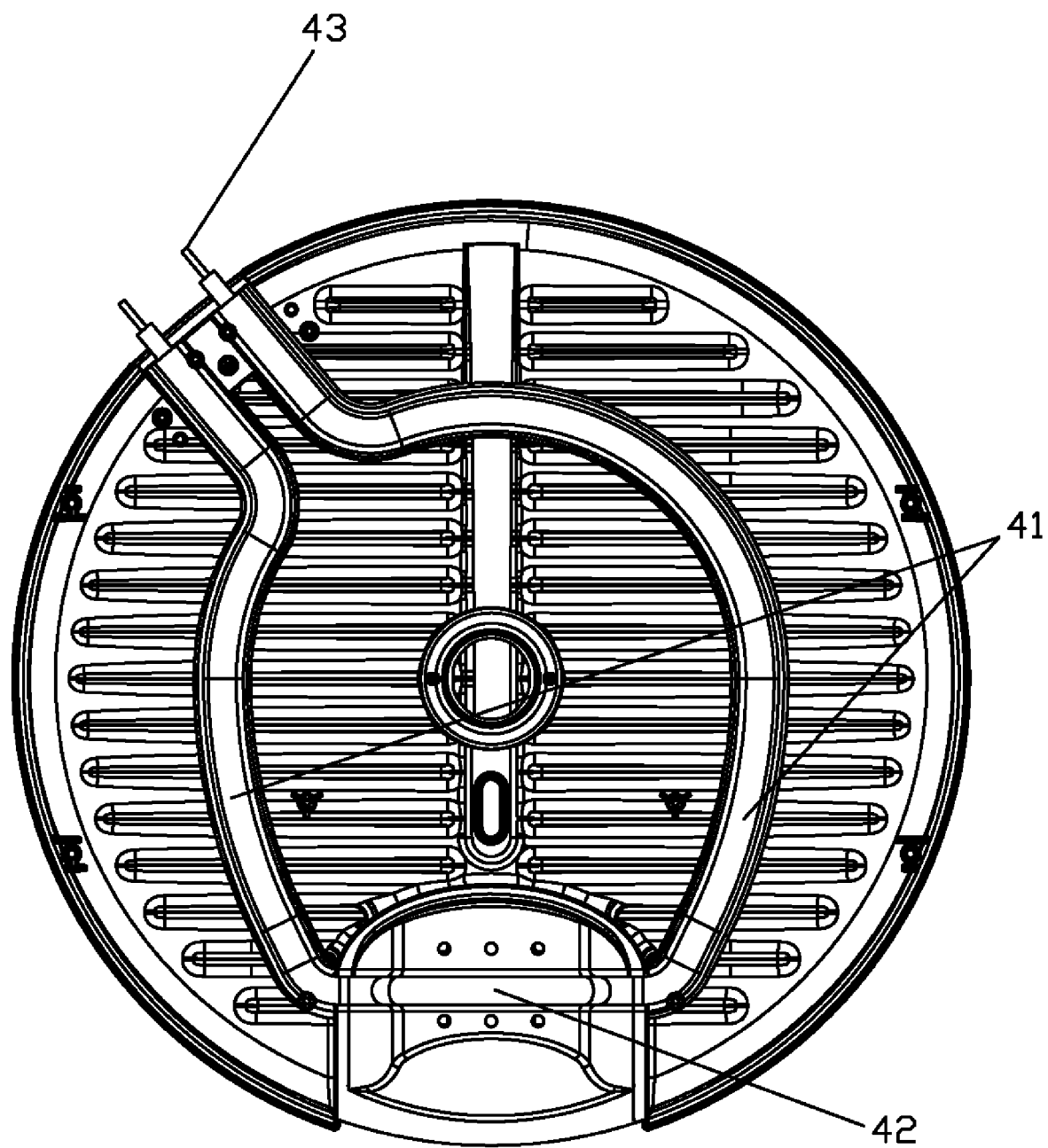
FIG. 3 is a bottom view according to a preferred embodiment of the smoking grill pan.

The present invention will be further described according to the preferred embodiment as follows:

Referring to FIGS. 1 to 3, the smoking grill pan of the invention comprises a main body 10, an electrothermal tube disposed on the lower surface of the main body 10. The electrothermal tube comprises a normal-temperature area 41 for grilling food and a high-temperature area 42 for burning smoking materials to generate smoke; the normal-temperature area 41 and the high-temperature area 42 are integrally connected, and the two ends of the electrothermal tube have an adapter 43 connected to exterior power supply. There is a smoking box 20 for containing smoking materials disposed on the main body 10 corresponding with the high-temperature area 42. The smoking box 20 has a lid 30 provided with plural smoke passage holes 31. The high-temperature area 42 is set close to the edge of the main body 10, and the smoking box 20 is set close to a corner of the edge of the main body 10.

The foregoing description of the exemplary embodiment of the invention has been presented for the purposes of illustration and description. It is not intended to be exhaustive or to limit the invention to the precise form disclosed. Many modifications and variations are possible in light of the above teaching. All changes that come within the meaning and range of equivalency of the claims are to be embraced within their scope.

What is claimed is:

1. A smoking grill pan, comprises:
    a main body;
    an electrothermal tube disposed on a lower surface of the main body; wherein
        the electrothermal tube comprises a normal-temperature area for grilling food and a high-temperature area for burning a smoking material to generate smoke,
        the normal-temperature area and the high-temperature area are integrally connected, and
        two ends of the elecrothermal tube are connected to an adapter for connection to an exterior power supply; and
    a smoking box, formed on said main body corresponding to said high-temperature area, for containing the smoking material.

2. The smoking grill pan according to claim 1, wherein said smoking box has a lid provided with plural smoke passage holes.

3. The smoking grill pan according to claims 1, wherein said high-temperature area is set close to an edge of the main body, and said smoking box is set close to a corner of the edge of the main body.

4. The smoking grill pan according to claim 1, wherein said smoking material is charcoal or a wood chip.

* * * * *